(12) United States Patent
Lin et al.

(10) Patent No.: US 7,586,253 B2
(45) Date of Patent: Sep. 8, 2009

(54) ENHANCED PLANE LIGHT SOURCE

(75) Inventors: Yi-Ping Lin, Hsinchu (TW); Jung-Yu Li, Hsinchu (TW); Ching-Sung Hsiao, Hsinchu (TW)

(73) Assignee: Industrial Technology Research Institute, Hsinchu Hsien (TW)

( * ) Notice: Subject to any disclaimer, the term of this patent is extended or adjusted under 35 U.S.C. 154(b) by 405 days.

(21) Appl. No.: 11/417,039

(22) Filed: May 4, 2006

(65) Prior Publication Data

US 2007/0152564 A1    Jul. 5, 2007

(30) Foreign Application Priority Data

Dec. 29, 2005    (TW) .............................. 94147100 A

(51) Int. Cl.
*H01J 1/62* (2006.01)
(52) U.S. Cl. .......................... 313/496; 313/495; 445/24
(58) Field of Classification Search ......... 313/495–497, 313/306, 309–310, 346, 351, 355, 293–304
See application file for complete search history.

(56) References Cited

U.S. PATENT DOCUMENTS 5,378,962 A * 1/1995 Gray et al. ................. 313/495
2003/0062823 A1* 4/2003 Dunphy ...................... 313/495
2004/0104668 A1* 6/2004 Lee et al. .................... 313/496
2005/0174038 A1* 8/2005 Lee et al. .................... 313/495
2005/0174040 A1* 8/2005 Jung et al. ................... 313/495
2005/0179398 A1* 8/2005 Onishi ....................... 315/169.2
2006/0113891 A1* 6/2006 Nishimura et al. .......... 313/496
2007/0247048 A1* 10/2007 Zhang et al. ................ 313/311

* cited by examiner

*Primary Examiner*—Peter J Macchiarolo
*Assistant Examiner*—Donald L Raleigh
(74) *Attorney, Agent, or Firm*—Birch, Stewart, Kolasch & Birch, LLP

(57) ABSTRACT

An enhanced plane light source has a luminescent layer independently disposed in each recess formed on a light-transmittable substrate, so that field emission electrons directly impact the luminescent layer to produce light, which is not shielded by the cathode. The enhanced plane light source also includes a substrate forming a bottom structure thereof. The bottom substrate has a metal reflection surface to increase the reflectivity and upgrade light-emitting efficiency and luminous intensity. The recesses on the light-transmittable substrate have an approximate semi-circular or semi-parabolic cross section to increase the high field region at the cathode and the effective luminescent area at the anode, so that the luminous intensity and evenness are also largely increased.

13 Claims, 3 Drawing Sheets

ENHANCED PLANE LIGHT SOURCE

FIELD OF THE INVENTION

The present invention relates to a plane light source, and more particularly to an enhanced plane light source.

BACKGROUND OF THE INVENTION

It has been found that carbon nanotubes and carbon nanowalls, which are also referred to as carbon nano material, have better field emission characteristic, compared to the conventional field emitter of tungsten filament. Currently, the use of carbon nano material as a cathode has been applied to the manufacture of carbon nanotube field emission element and carbon nanotube field emission display.

FIG. 1 shows a conventional fully-flattened reflective plane light source, which includes a rod-shaped cathode 10, on which carbon nanotube field emitters 11 are formed, and an anode 20, which is a sheet glass 21 having a layer of metal reflective coating 22 deposited thereon and a layer of fluorescent powder 23 applied on the metal reflective coating 22. Due to a high electric field between the cathode 10 and the anode 20, electrons are released from the cathode 10 to impact the fluorescent powder 23 applied on the anode 20, causing the fluorescent powder 23 to illuminate. The metal reflective coating 22 further increases the luminous intensity of light emitted by the fluorescent powder 23. Since this type of reflective plane light source has limited number of releasable field emission electrons, and unevenly distributed internal electric field, it is uneasy to control an overall brightness and evenness of the luminescence thereof.

FIG. 2 shows another conventional reflective plane light source, which includes a cathode 30 having a plurality of field emitters 31 having carbon nano material formed on a metal rod or a metal sheet, and a sheet glass 41 on which a plurality of recesses 42 are provided and a metal reflective coating 43 is formed in each of the recesses 42. The field emitters 31 are separately disposed in the recesses 43 on the sheet glass 41 to form an array. This conventional reflective plane light source illuminates in the same manner as the fully-flattened reflective plane light source of FIG. 1. The recesses 42 with the metal reflective coating 43 may effectively reflect the light source to increase the luminous intensity. However, the conventional reflective plane light source of FIG. 2 could not be effectively utilized because a part of reflected light from the illuminated fluorescent powder 44 is shielded by the cathode 30.

SUMMARY OF THE INVENTION

A primary object of the present invention is to provide an enhanced plane light source, which includes a luminescent layer independently arranged in an anode structure, so that field emission electrons from the cathode may directly impact the luminescent layer to produce light, which is not shielded by the cathode; and a reflective bottom layer to enhance the luminous intensity; so as to generally solve the drawbacks in the prior art.

To achieve the above and other objects, the enhanced plane light source according to the present invention includes a light-transmittable substrate, a luminescent layer, a plurality of field emitter elements, and a substrate. The light-transmittable substrate is provided with more than one recess, in each of which a luminescent layer is formed. The field-emitter elements are arrayed in the recesses above the luminescent layer. The substrate forms a bottom structure of the plane light source and is disposed above the light-transmittable substrate to enclose a closed space therebetween for receiving the luminescent layer and the field emitter elements therein. One surface of the substrate facing toward the luminescent layer and the field emitter elements is a metal reflection surface capable of reflecting a light source. When the field emitter elements produce field emission electrons under an electric field, the field emission electrons directly impact the luminescent layer to produce light. The metal reflection surface of the substrate reflects the produced light to largely increase the luminous intensity thereof.

In the enhanced plane light source of the present invention, the light-transmittable substrate may have a plurality of recesses, in each of which one field emitter element is disposed. The recesses may have an approximate semi-circular or a semi-parabolic cross section, so that the light source diverges in directions perpendicular to the semi-circular or the semi-parabolic anodic structure. In this manner, the high electric field region at the cathode is expanded and the field emission electron emission rate is increased to further increase the luminous intensity and evenness. Therefore, a diffuser may be omitted.

The enhanced plane light source of the present invention reserves the advantage of the conventional reflective plane light source in maintaining good vacuum inside the light source without the need of using a spacer when the components of the light source are assembled and packaged.

BRIEF DESCRIPTION OF THE DRAWINGS

The structure and the technical means adopted by the present invention to achieve the above and other objects can be best understood by referring to the following detailed description of the preferred embodiments and the accompanying drawings, wherein.

DETAILED DESCRIPTION OF THE PREFERRED EMBODIMENTS

Figure 1:
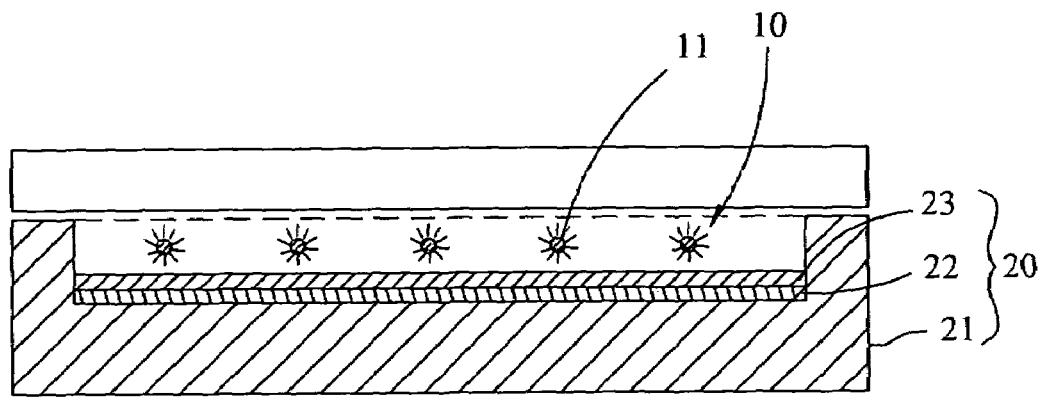
FIG. 1 is a sectioned side view showing the structure of a conventional fully-flattened reflective plane light source.
Figure 2:
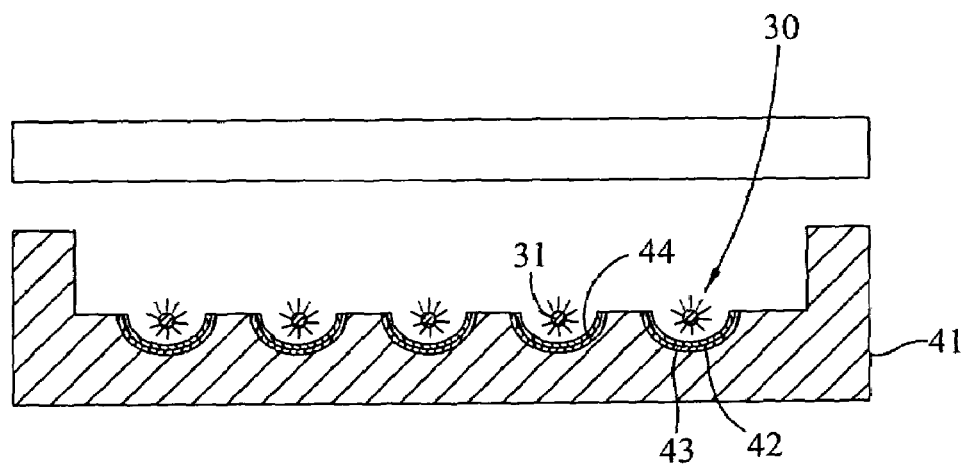
FIG. 2 is a sectioned side view showing the structure of another conventional reflective plane light source.
Figure 3:
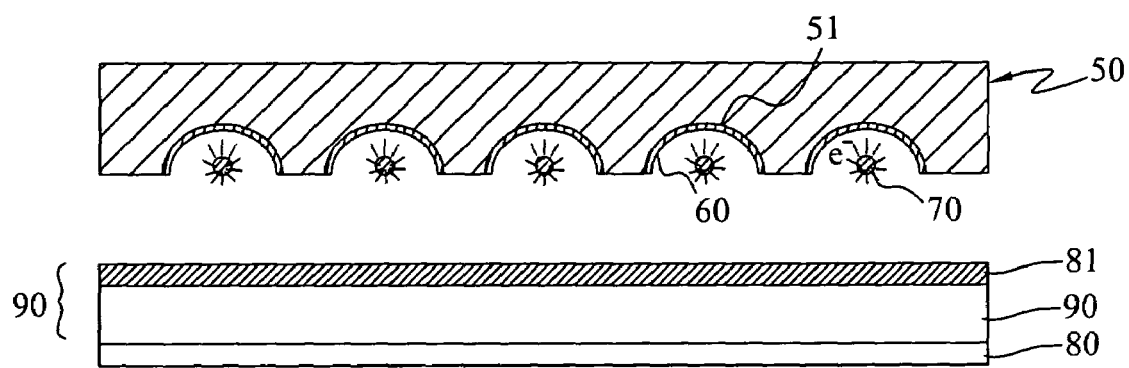
FIG. 3 is a sectioned side view showing an enhanced plane light source according to a preferred embodiment of the present invention.

Please refer to FIG. 3 that is a sectioned side view showing the structure of an enhanced plane light source according to a preferred embodiment of the present invention. As shown, the enhanced plane light source of the present invention includes a light-transmittable substrate 50, a luminescent layer 60, a plurality of field emitter elements 70, and a substrate 80.

The light-transmittable substrate 50 is formed with a plurality of approximate spherical recesses 51. The luminescent layer 60 is formed in each of the recesses 51. The field emitter elements 70 are separately disposed in the recesses 51 above the luminescent layer 60. The substrate 80 has a metal reflection surface 81, which is able to reflect a light source, and is disposed on the light-transmittable substrate 50 with the metal reflection surface 81 facing toward the luminescent layer 60 and the field emitter elements 70, so that a closed space is formed between the substrate 80 and the light-transmittable substrate 50 when they are assembled together.

In the enhanced plane light source of the present invention, the field emitter element 70 may be made of a carbon nano material to produce a high electric field and induce field emission electrons to obtain very low turn-on field and operating voltage. Alternatively, the field emitter element 70 may be made of an oxide or a metal structure capable of enhancing the field emission characteristic to achieve the same effect.

In the illustrated embodiment, the field emitter element 70 is formed by growing a carbon nano material on a metal rod to serve as a cathode. The carbon nano material may be selected from carbon nanotubes or carbon nanowalls. An anode in the present invention includes the light-transmittable substrate 50 coated with the luminescent layer 60. With this structure, the field emission electron e⁻ directly impacts the luminescent layer 60 to produce light, which is not shielded by the cathode. Meanwhile, the metal reflection surface 81 on the substrate 80, which forms the bottom structure of the present invention, enables the effective utilization of all light sources.

In the illustrated preferred embodiment, for the purpose of an increased electron field emission rate, the recesses 51 on the light-transmittable substrate 50 have an approximate semi-circular or a semi-parabolic cross section. Of course, the recesses 51 may also be any other form that is able to increase the effective luminescent area. This design not only largely expands the high electric field region on the cathodic surface, so that more field emission electrons e⁻ are easily released from the cathode to directly impact the independently arranged luminescent layer 60 for the same to illuminate, but also reduces the operating voltage and increases the luminous intensity of the present invention. Moreover, the approximate semi-circular or semi-parabolic cross section of the recess 51 also enables a much even distribution of internal electric fields. And, when the produced light diverges in directions perpendicular to the semi-circular or the semi-parabolic surface of the recesses 51, there is an increased effective luminescent area to enable increased luminous intensity and evenness.

The light-transmittable substrate 50 in the illustrated embodiment is directly coated with conductive fluorescent powder, which forms the luminescent layer 60, to constitute the anodic structure. Alternatively, the light-transmittable substrate 50 may be made of a transparent conducting material, such as a transparent conducting glass, which is then applied with fluorescent powder to form the luminescent layer 60. Moreover, the light emitted from the enhanced plane light source of the illustrated embodiment varies with the types of the fluorescent powder used. The recesses 51 may be differently arrayed depending on a desired application, such as a lighting fixture, a display, or the like, to create linear area light sources, or point light sources or pixels, such as a light emission dot matrix of red, blue, and green light.

The substrate 80 in the illustrated embodiment has one surface coated with a metal reflective film 90 to form the metal reflection surface 81 for increasing the brightness. Of course, the substrate 80 may also be directly made of a metal material capable of reflecting a light source.

The illustrated embodiment of the present invention has been tested and compared with the conventional reflective plane light source via an electric field simulation test.

Figure 4B:
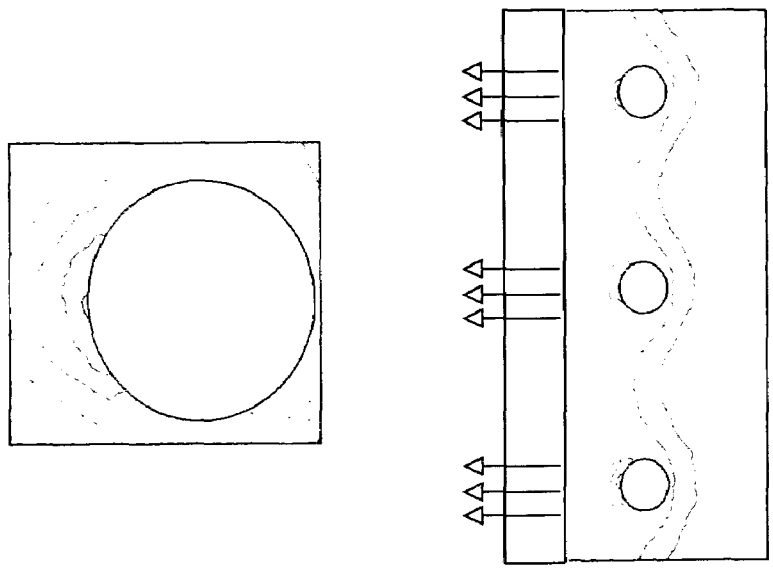
FIGS. 4A and 4B show the enhanced plane light source of the present invention and the conventional reflective plane light source, respectively, in an electric field simulation test.
Figure 4A:
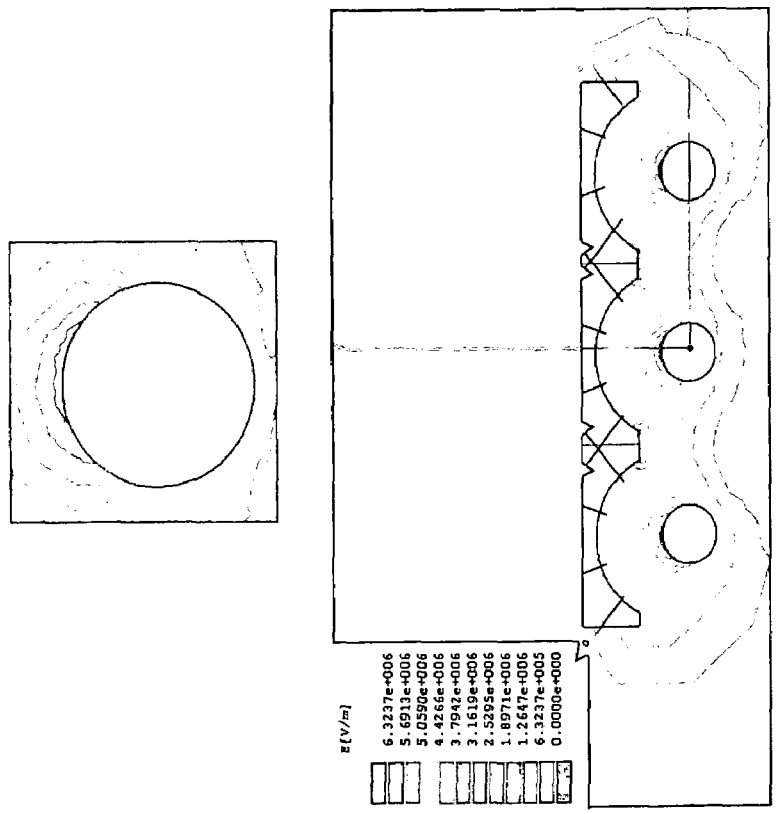

FIGS. 4A and 4B show the enhanced plane light source according to the present invention and the conventional reflective plane light source, respectively, in the electric field simulation test. The test results indicate that both the present invention and the conventional reflective plane light source use a rod-shaped cathodic structure, so that the circumferential surface of an upper half of the rod-shaped cathode has increased field intensity, and the operating voltage is reduced. Meanwhile, the demands for high-quality carbon nanotube growth can be lowered.

As indicated by the electric field simulation of FIG. 4A, the high field region on the surface of the rod-shaped cathodic structure of the enhanced plane light source of the present invention is larger than that on the conventional reflective plane light source, enabling the present invention to have increased field emission electron emission rate, increased luminescent area, and enhanced light intensity. Moreover, in the conventional reflective plane light source, light is emitted perpendicular to the light-transmittable substrate surface. However, in the present invention, light is diverged in directions perpendicular to the semi-circular surface to increase the evenness of light emission from the plane light source. As can be seen from FIG. 4A, the present invention also has increased field uniformity.

In conclusion, in the enhanced plane light source of the present invention, the field emission electrons may directly penetrate the luminescent layer to produce light, and the light produced by the luminescent layer is not blocked by the cathode. And, the reflective bottom structure further increases the reflectivity, the brightness, and the light-emitting efficiency of the present invention.

In addition, the approximate semi-circular or semi-parabolic anodic structure in the present invention also allows the increase of high field region on the cathodic surface, and accordingly, the increase of field emission electron emission rate as well as light intensity. Meanwhile, the effective luminescent area is also increased to increase the luminous intensity. Moreover, with the approximate semi-circular or semi-parabolic anodic structure, light is projected perpendicular to the spherical surface, making the light more uniform without the need of a diffuser. However, a diffuser may still be used, if desired. Further, the present invention does not require a spacer to keep the cathode from the anode, and can therefore be manufactured at reduced cost.

The present invention may be applied to illumination in an expectation of raising the light-emitting efficiency to 80-100 lm/W to widely replace the fluorescent lamp.

The present invention may also be applied to display to replace the conventional vertical field emission display. It is expected the present invention may be applied to the back light source for the liquid crystal display (LCD), lighting fixtures, and displays. Since the present invention has the advantages of saving energy, short responding time, high light-emitting efficiency, easy to produce, and being mercury-free and therefore environment friendly, it provides the market an alternative light-emitting source and display.

The present invention has been described with a preferred embodiment thereof and it is understood that many changes and modifications in the described embodiment can be carried out without departing from the scope and the spirit of the invention that is intended to be limited only by the appended claims.

What is claimed is:

1. An enhanced plane light source, comprising:
   a light-transmittable substrate having an array of plural recesses formed thereon;
   a luminescent layer being formed in each said recesses on said light-transmittable substrate, wherein said light-transmittable substrate with said luminescent layers formed in said recesses serving as an anode of said enhanced plane light source;
   a plurality of rod-shaped field emitter elements, each of said field emitter elements serving as a cathode of said enhanced plane light source, and being arrayed, respectively, above said luminescent layer in each of said recesses; and a substrate having a metal reflection surface capable of reflecting a light source, and being disposed on said light-transmittable substrate with said metal reflection surface facing toward said field emitter elements, so that a closed space is formed between said substrate and said light-transmittable substrate.

2. The enhanced plane light source as claimed in claim 1, wherein each of said recesses has a semi-circular cross section.

3. The enhanced plane light source as claimed in claim 2, wherein each of said recesses has a semi-parabolic cross section.

4. The enhanced plane light source as claimed in claim 1, wherein said field emitter elements are formed of a carbon nano material.

5. The enhanced plane light source as claimed in claim 4, wherein said carbon nano material is carbon nanotubes.

6. The enhanced plane light source as claimed in claim 4, wherein said carbon nano material is carbon nanowalls.

7. The enhanced plane light source as claimed in claim 1, wherein said field emitter elements are formed of oxides and metals capable of enhancing a field emission characteristic.

8. The enhanced plane light source as claimed in claim 1, wherein said light-transmittable substrate is formed of a transparent conducting material.

9. The enhanced plane light source as claimed in claim 1, further comprising a transparent conducting layer formed in said recesses on said light-transmittable substrate to locate, below said luminescent layer.

10. The enhanced plane light source as claimed in claim 1, wherein said luminescent layer comprises fluorescent powder.

11. The enhanced plane light source as claimed in claim 10, wherein said fluorescent powder is conductive fluorescent powder.

12. The enhanced plane light source as claimed in claim 1, wherein said substrate is formed on a surface with a metal reflective film to provide said metal reflection surface.

13. The enhanced plane light source as claimed in claim 1, further comprising a diffuser.

* * * * *